US010251020B1

(12) United States Patent
Swart (10) Patent No.: US 10,251,020 B1
(45) Date of Patent: Apr. 2, 2019

(54) BLUETOOTH LOW ENERGY (BLE) REAL-TIME LOCATION SYSTEM (RTLS) HAVING TAGS, BEACONS AND BRIDGES, THAT USE A COMBINATION OF MOTION DETECTION AND RSSI MEASUREMENTS TO DETERMINE ROOM-LOCATION OF THE TAGS (71) Applicant: Infinite Leap, Inc., Fargo, ND (US)

(72) Inventor: John A. Swart, Grand Rapids, MI (US)

(73) Assignee: Infinite Leap, Inc., Fargo, ND (US)

(*) Notice: Subject to any disclaimer, the term of this patent is extended or adjusted under 35 U.S.C. 154(b) by 0 days.

(21) Appl. No.: 16/010,747

(22) Filed: Jun. 18, 2018

Related U.S. Application Data (63) Continuation-in-part of application No. 15/610,072, filed on May 31, 2017, now Pat. No. 10,028,105.

(60) Provisional application No. 62/343,242, filed on May 31, 2016, provisional application No. 62/627,265, filed on Feb. 7, 2018.

(51) Int. Cl.

| H04W 24/00 | (2009.01) |
|---|---|
| H04W 4/02 | (2018.01) |
| G08B 13/24 | (2006.01) |
| H04W 8/00 | (2009.01) |
| H04W 4/80 | (2018.01) |
| H04W 88/02 | (2009.01) |
| G06K 19/07 | (2006.01) |
| H04M 1/725 | (2006.01) |

(52) U.S. Cl.
CPC .......... *H04W 4/02* (2013.01); *G08B 13/2462* (2013.01); *H04W 4/80* (2018.02); *H04W 8/005* (2013.01); *G06K 19/0723* (2013.01); *H04M 1/72519* (2013.01); *H04M 1/72522* (2013.01); *H04W 88/02* (2013.01)

(58) Field of Classification Search
CPC ....... H04W 64/00; H04W 4/02; H04W 8/245; H04W 88/0008; H04L 29/08657; G06K 7/0008; G06K 19/0723; H04M 1/72519; H04M 1/72522
USPC ........................................... 455/456.1, 456.5
See application file for complete search history.

(56) References Cited

U.S. PATENT DOCUMENTS

| 9,810,767 B1 | 11/2017 | Hamilton | |
| 2003/0197612 A1* | 10/2003 | Tanaka | G06K 17/00 340/572.1 |
| 2007/0046434 A1 | 3/2007 | Chakraborty | |
| 2008/0172271 A1* | 7/2008 | Wee | G06Q 30/02 705/7.29 |

(Continued)

*Primary Examiner* — Danh C Le
(74) *Attorney, Agent, or Firm* — Frank M. Scutch, III (57) ABSTRACT

The present invention relates generally to a real-time location system (RTLS) and more particularly to a Bluetooth Low Energy (BLE) RTLS having tags, bridges, and beacons. To determine which room a tag is in, beacons broadcast BLE advertisements containing motion-status information about recent history of perceived motion in a room as determined from a motion sensor in the beacon. Tags report received signal strength indications (RSSI) from nearby beacons, motion-in-room status sensed and reported by those beacons, plus their own motion status based on a tag-based accelerometer. A series of location-engine steps estimates the room-location of the tags based on a combination of RSSI analysis, and a comparison of tag-motion history to the perceived and recorded motion-status in a room. The analysis of tag-motion history and motion-in-room status produces a better estimate of room-level location of the tag than an RSSI estimate can produce alone.

13 Claims, 3 Drawing Sheets

(56) References Cited

U.S. PATENT DOCUMENTS

| | | | |
|---|---|---|---|
| 2010/0280874 A1* | 11/2010 | Thorn | G06Q 30/00 705/14.64 |
| 2010/0328073 A1* | 12/2010 | Nikitin | G01S 5/0247 340/572.1 |
| 2011/0072132 A1 | 3/2011 | Shafer | |
| 2011/0080267 A1 | 4/2011 | Clare | |
| 2013/0141233 A1 | 6/2013 | Jacobs | |
| 2013/0201003 A1 | 8/2013 | Sabesan | |
| 2013/0231775 A1* | 9/2013 | Jefferies | G06Q 10/087 700/237 |
| 2013/0281084 A1* | 10/2013 | Batada | H04W 4/043 455/426.1 |
| 2014/0197926 A1* | 7/2014 | Nikitin | G06K 7/10009 340/10.1 |
| 2014/0351498 A1 | 11/2014 | Hsueh | |
| 2015/0063472 A1 | 3/2015 | Chatterton | |
| 2015/0269818 A1* | 9/2015 | Jain | G08B 13/248 340/572.1 |
| 2015/0341331 A1* | 11/2015 | Weksler | H04L 63/08 726/4 |
| 2015/0371068 A1* | 12/2015 | Sandell | G06K 7/10198 340/10.1 |
| 2016/0029160 A1* | 1/2016 | Theurer | H04W 4/02 455/456.1 |
| 2016/0142884 A1* | 5/2016 | Sears | H04W 40/244 455/404.2 |
| 2016/0261986 A1* | 9/2016 | Nord | H04W 4/023 |
| 2016/0295358 A1 | 10/2016 | Cariss | |
| 2016/0295376 A1 | 10/2016 | Geng et al. | |
| 2017/0006417 A1* | 1/2017 | Canoy | H04L 63/126 |
| 2017/0032354 A1* | 2/2017 | Tilahun | G06Q 20/3223 |
| 2017/0111763 A1* | 4/2017 | Morgan | H04W 4/029 |
| 2017/0142549 A1 | 5/2017 | Herbert | |
| 2017/0150321 A1* | 5/2017 | Ciecko | H04W 4/029 |
| 2017/0313426 A1 | 11/2017 | Morin | |

* cited by examiner

BLUETOOTH LOW ENERGY (BLE) REAL-TIME LOCATION SYSTEM (RTLS) HAVING TAGS, BEACONS AND BRIDGES, THAT USE A COMBINATION OF MOTION DETECTION AND RSSI MEASUREMENTS TO DETERMINE ROOM-LOCATION OF THE TAGS

CROSS-REFERENCE TO RELATED APPLICATIONS

This application is a continuation-in-part (CIP) and claims priority under 35 U.S.C. § 120 to U.S. application Ser. No. 15/610,072 filed on May 31, 2017 which claims priority to Provisional application Ser. No. 62/343,242 filed on May 31, 2016. This application also claims priority under 35 U.S.C § 119(e) to Provisional application Ser. No. 62/623,561 filed on Jan. 30, 2018. Applicant also claims priority to co-pending patent application Ser. No. 16/010,732, entitled "A BLUETOOTH LOW ENERGY (BLE) REAL-TIME LOCATION SYSTEM (RTLS) HAVING TAGS, BEACONS AND BRIDGES, THAT USE A COMBINATION OF MOTION DETECTION AND RSSI MEASUREMENTS TO DETERMINE ROOM-LOCATION OF THE TAGS" filed concurrently herewith. All of these applications are owned by Infinite Leap, Inc. and are incorporated by reference in their entireties.

FIELD OF THE INVENTION

The present invention relates generally to a real-time location system (RTLS) and more particularly to a Bluetooth Low Energy (BLE) RTLS having stationary beacons that advertise, active tags that listen for BLE advertisements, and bridges that pass location updates to a location algorithm in a central server.

BACKGROUND OF THE INVENTION

RTLS systems estimate locations for moving tags within a floor plan of interior rooms, in buildings such as hospitals. Many RTLS systems based on radio-frequency signals such as BLE, are designed to have moving tags that transmit a BLE advertisement, in a field of receiving devices called BLE gateways, sensors, bridges or Access Points. A network of BLE gateways will use received signal strength of advertisements from a tag, as a proxy for estimating the distance between the tag and each gateway and use multi-lateration algorithms to estimate the locations of tags. Those approaches with tags that transmit are standard in the industry and provide location estimates that are acceptable for may use cases in industrial and manufacturing environments. But they fail to scale to provide an efficient location system for the largest environments with a dense deployment of tags, like large hospitals.

To illustrate the scaling problem, imagine a hospital with 10,000 tags, each of which are beaconing 3 times per second, within a field of BLE gateways that report received signal strength to a location engine. Perhaps 1000 of those tags move each hour to a new location. At least three BLE gateways MUST hear a tag to be tri-laterated. In practice, systems are typically designed so that as many as five-to-ten gateways hear each tag, for redundancy in case some gateways are blocked or do not successfully hear the tag. In addition, gateways on floors above and below the tag may hear the tag transmission and must forward the signal-strength readings. So for demonstration of the limitations on scaling of the standard industry design, let's assume that ten gateways hear each tag transmission and forward the reading to the location engine. Ten-thousand (10,000) tags transmitting 3 times per second create 30,000 beacons transmitted per second. If ten gateways hear each ping and forward those messages to the location engine, the location engine receives 300,000 signal-strength readings per second. That extrapolates to about 1 billion readings received per hour, which must all be processed to determine the locations of tags. Even though only a fraction of the 10,000 assets would have moved in that hour, a billion messages would be processed to discover which tags had moved, and the new locations of the assets which may have moved. Forwarding and processing those billion messages per hour requires substantial networking and computing resources. Thus, new solutions using fewer resources are needed to better locate and track large numbers of assets.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to an RTLS having stationary beacons that advertise, active tags that listen for BLE advertisements, and bridges that pass location updates to a location algorithm in a central server. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of RTLS having tags, bridges, and beacons. The non-processor circuits may include, but are not limited to, a radio receiver, a radio transmitter, signal drivers, clock circuits, power source circuits, and user input devices. As such, these functions may be interpreted as steps of a method to perform tag functions, bridge functions, and beacon functions. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The current invention proposes a scalable RTLS design. Tags no longer transmit regular advertisements. Instead, fixed beacons mounted in each named location (e.g., each room) would transmit the advertisements, providing a field of beacon reference points within the building. Tags listen for beacons when they are moving. Tags with onboard processors process the patterns of beacons they hear, to estimate (when the patterns of received beacons have changed) when the tag has moved to a new location. Only when a tag has determined that it may have moved, does it transmit a (single) message to the location engine. To estimate the savings in location-engine processing of the present invention, let's review the numerical example used above. If 10,000 assets are in a hospital, and 1000 move in an hour, the location engine would receive messages from just those 1000 tags. There is no reason for the 9000 non-moving tags to send location update messages. Even if each of the 1000 moving tags sends 1000 messages while moving, there are just 1 million messages sent to the location engine per hour. That load on the transmission network and the location-engine processor is reduced by three orders of magnitude.

Figure 1:
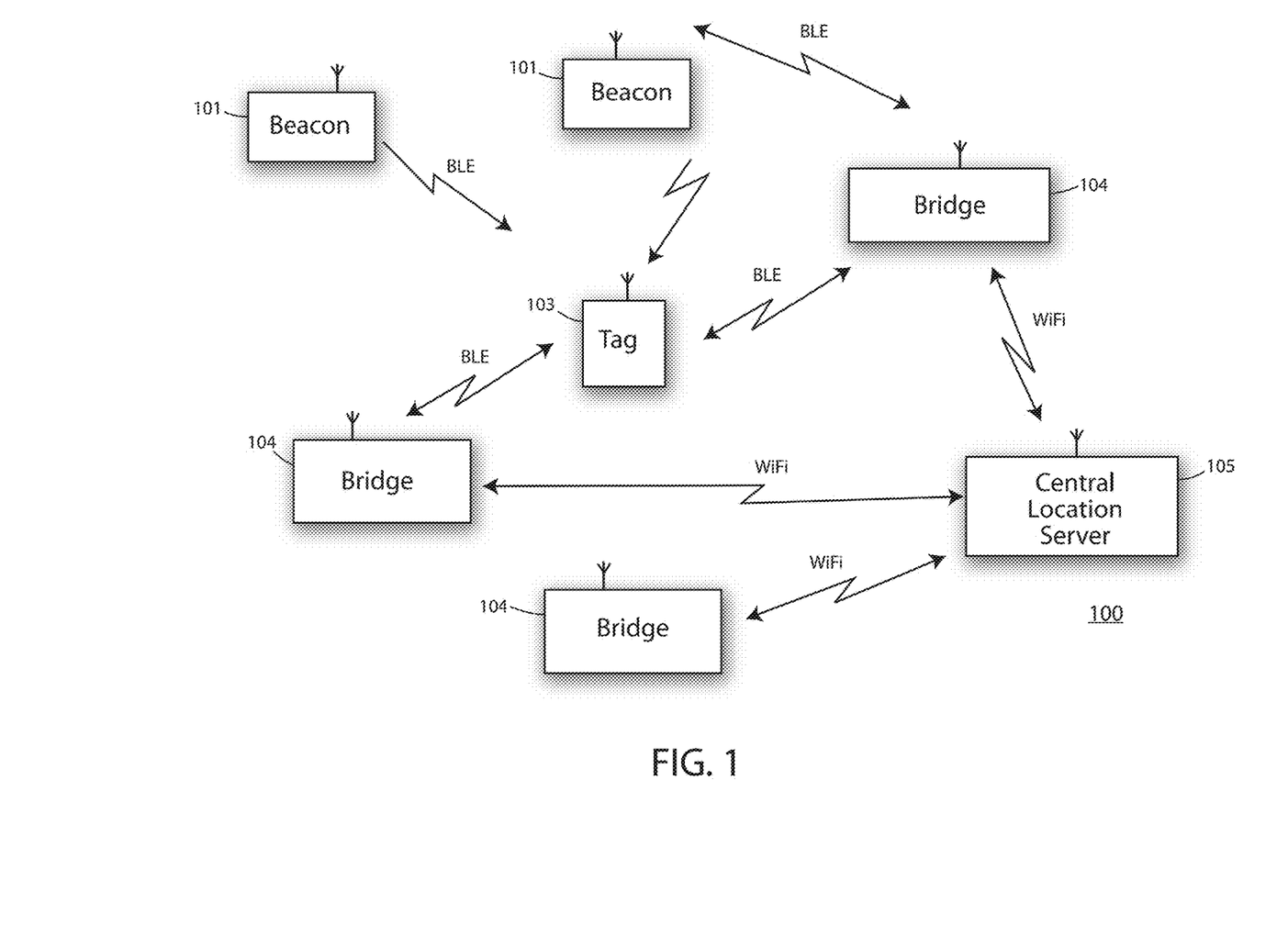
FIG. 1 a block diagram illustrating components in an RTLS, including tags, beacons, bridges, and a location engine.

FIG. 1 a block diagram illustrating components used in the BLE RTLS in accordance with various embodiments of the invention. The system 100 includes one or more fixed (in-room) beacon transmitters 101 that operate using a BLE signal advertisement on one to three channels, which contains a report of motion-status as determined by a motion sensor in the beacon. The motion status reported in the advertisement is at least one bit that toggles to represent "I see motion (in my room)" or "I see no motion (in my room)", and may also be several bits to include a description of how much motion is seen, and indicators of recent motion-state transitions. The advertisement is received by tags 103. One or more tags 103 process the beacon advertisements, including the motion status reported by the beacons, comparing the motion status of beacons (and rooms), to the tag's own motion status, as determined by an on-board accelerometer. After some analysis of the tag's received beacon advertisements, and analysis of the contents of those beacon signals, the tag may estimate its likely closest beacon/room-location and transmit a location update message to one or more bridges 104. The received signal strength and content of this tag-location update is retransmitted by the bridges via Wi-Fi to a central location server 105. As is already typical in the industry, the central location server may employ trilateration algorithms on the signal strength reports it receives from multiple bridges to form one estimate of the location of the tag. All of this information, including signal strengths of tag transmissions heard at the bridges, location updates from the tags about coincident motion reports from the tag accelerometer and fixed beacons, is factored into the location algorithm at the central location server. The output of the location algorithm is a location estimate, which is an attempt to identify the room-location of the tag.

Thus, the system in FIG. 1 includes a novel feature not taught in the prior art namely; a system of beacons, tags, bridges and a location engine, which enables the location engine to combine two location estimates: one location estimate based on received signal strength, and a second location estimate based on motion status of tags and motion reports of in-room beacons; to produce a combined location estimate, used to store a updated, estimated location of the tag.

Figure 2:
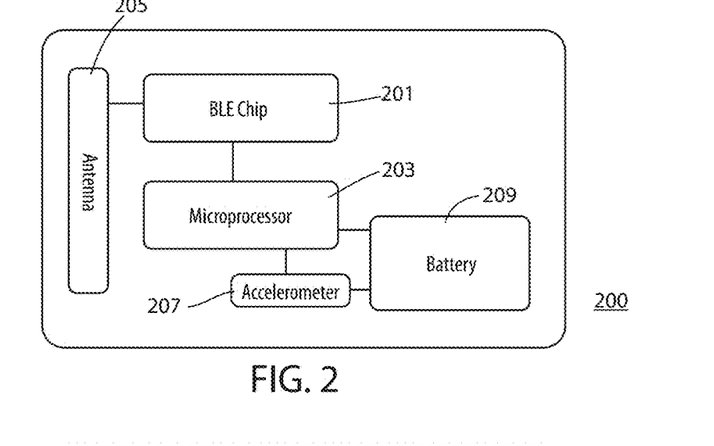
FIG. 2 is a block diagram illustrating components used in the tag.

FIG. 2 is a block diagram illustrating system components used in the tag. The tag 200 includes a low energy BLE transceiver 201 that works to transmit and receive Bluetooth radio frequency (RF) signals. The BLE transceiver 201 is connected to a microprocessor 203 for controlling the operation of the transceiver, including the comparison of the tag's motion to the reports of motion sensed by neighboring beacons. The BLE transceiver is also connected to an antenna 205 for providing communication to other devices. The tag further includes an accelerometer 207 connected to microprocessor 203 for detecting motion of the tag and a battery 209 for powering electronic components in the device.

Figure 3:
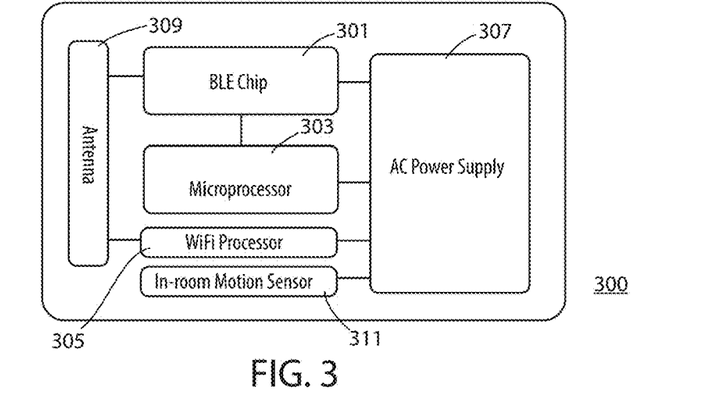
FIG. 3 is a block diagram illustrating components used in the bridge.

FIG. 3 is a block diagram illustrating components used in the bridge as seen in FIG. 1. The bridge 300 includes one or more BLE transceivers 301 that connect to a microprocessor 303 for controlling operation of the transceiver(s) 301. A Wi-Fi processor 305 also connects to the processor 303 for transmitting and receiving Wi-Fi signals. An AC power supply 307 is connected to the BLE transceiver 301, microprocessor 303 and the Wi-Fi processor 305 for powering these devices. The AC power supply 307 may include components for retention of some energy even after being unplugged for some time period. An antenna 309 is connected to both the BLE transceiver 301 and the Wi-Fi processor 305 for transmitting and receiving BLE and Wi-Fi RF signals to these devices at the appropriate frequency. The bridge 300 may include an in-room motion sensor 311, such as a Passive-Infrared sensor, which detects human motion in the room where the bridge is located, by tracking changes in the infrared radiation in the room. Thus, the bridge 300 having a motion sensor 311 can determine if there are objects moving about it to help a central location server, to correlate motion status of rooms, to motion patterns of tags, and prefer location-estimation of the moving tags in rooms that are sensed to have coincident motion. This movement-history data can then be transmitted and/or stored in a movement-history-record database for determining location of one or more tags.

Figure 4:
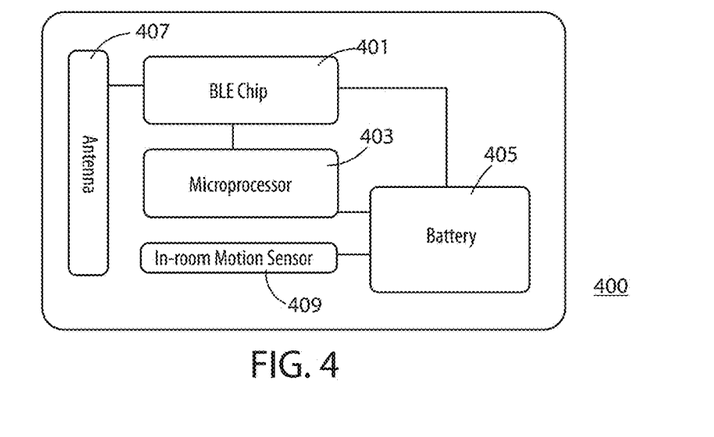
FIG. 4 is a block diagram illustrating components used in the beacon with an included motion sensor.

FIG. 4 (16) is a block diagram illustrating components used in the beacon that uses motion sensing. The beacon 400 includes components for transmitting BLE advertisements and includes one or more BLE transceivers 401 that connect to a microprocessor 403 for controlling the transceiver(s). A battery 405 connects to the BLE transceiver(s) 401 and the microprocessor 403 for powering these devices. As described herein, the beacon 400 typically is placed in the ceiling of a room so that tags can easily receive the beacon signal from the BLE transceiver 401 when the tags are moved between locations/between rooms. The beacon 400 includes one or more antennas 407 for providing gain. The beacon includes an in-room motion sensor 409, such as a Passive-Infrared sensor, which detects human motion in the room where the bridge is located, by tracking changes in the infrared radiation in the room. The motion sensor 409 is connected to both the microprocessor 403 and battery 405, for detecting motion of anything within its vicinity. Thus, the motion sensor 409 can determine if there are objects moving about it to help a central location server, to correlate motion status of rooms, to motion patterns of tags, and prefer location-estimation of the moving tags in rooms that are sensed to have coincident motion. This data can then be transmitted and/or stored in a database for determining location of one or more tags.

Figure 5:
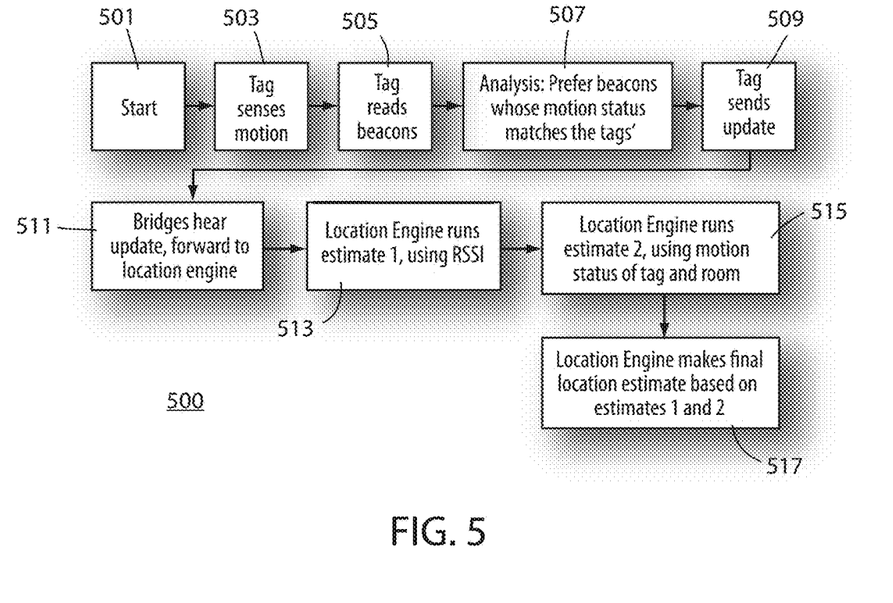
FIG. 5 is a flow chart diagram illustrating the steps using the tags, bridges and location engine server to estimate tag location.

FIG. 5 is a block diagram illustrating the location process. The methods 500 as shown in FIG. 5 including starting the process 501 where a tag senses motion 503. The tag will determine which beacon signals it receives 505 and the tag will perform an analysis where it will prefer (for estimating its location) beacons whose motion status matches that of the tag 507. For example, a tag that knows it is moving (because of a reading from its own accelerometer) may hear two beacons. If beacon A reports "I see motion in my room" status, and beacon B reports "I see no motion in my room" status, then the tag will prefer to estimate that it is in the same room with beacon A, because of coincident motion. The tag then transmits an update 509 and a bridge will receive the update and forward the update to a location engine 511. The location engine will then calculate a first location estimate based on radio signal strength indication (RSSI) data 513. Next, the location engine will calculate a second location estimate based on the comparison of motion status of the tag and beacons/rooms 515. Finally, the beacon will calculate a third location estimate based on the first location estimate and second location estimate 517. This FIG. 5 method for the location engine may distribute these functions among the tag's processor and location server processor.

In addition the scalability advantage of this listening-tag system over the prior art, a further advance in the current invention is the use of motion-status and in-room motion history, both in the moving tag and in the ceiling-mounted beacons. Radio frequency signals travel through walls. As a result, the location engine that relies solely on radio frequency signals to determine location has no information to determine which side of a wall that a tag is located. For some RTLS applications and use cases, determining which side of a wall an asset is on, and thereby determining which room an asset is in, is of the utmost importance. Therefore, an RTLS system may wish to estimate and report which room an asset is in, taking care to understand the wall-boundaries.

In one example, hospital assets are often stored in two adjacent rooms where the two rooms that share a common wall. One room holds clean patient-care equipment, and the second room holds soiled equipment. The equipment is placed on shelves that are against the shared wall. Therefore, from a physical-space perspective, clean assets are six inches on one side of a wall and soiled assets are six inches on the opposite side of the wall. A nurse using an RTLS system to find clean equipment needs to know which side of the wall an asset resides. Current, RTLS systems that use solely radio signals to locate the assets will struggle to provide the correct room-location estimate, in view of their relative close proximity.

In the prior art, radio signals sent by a tag to the multiple bridges will suffer from a variety of polarity fades (mismatches between the polarity of the transmitting antenna on the tag and the receive antenna on the bridge). These polarity fades work to dispel the general assumption that the RSSI of the advertisement from the tag to the bridge is directly correlated to the distance between the tag and the bridge. Therefore, this adds error to the location estimate, mis-estimating which room a clean or soiled asset is placed in. In addition, some of the tags will be blocked (by metal objects or other assets) from a clear line of sight to the one or more bridges, further breaking the correlation of signal strength to distance. Some of the tags will have their radio energy absorbed by human bodies or bags of water, further breaking the relationship of signal strength to distance. The tag may be placed in a location where it happens to suffer from a persistent multipath fade relative to a specific bridge, so that bridge will mis-estimate its distance to the tag. Finally, all of these radio fading effects are time-varying, as people and metal objects move through the hospital's rooms, so using radio signal strength alone to estimate the location of an asset tag will make a stationary asset appear to move from time to time.

All of these radio-fading effects make it very difficult to estimate which room each of the assets are placed, producing errored room-location estimates. Asset tags that are on the clean-room shelf are placed only a few inches from the wall that is shared with the soiled room. Assets in the soiled room are placed only a few inches on the other side of the wall. The clean assets are less than 1 foot from the soiled assets on opposite sides of the wall. Radio signals travel through walls relatively unimpeded. If the RTLS location algorithm has 1-meter accuracy 90% of the time, then the algorithm will fail to estimate the correct location of all assets. Hence, those skilled in the art will reach the conclusion that radio signal strength alone is insufficient for determining which room an asset is placed in, even if it is 1-meter accurate or half-meter accurate. Signal strengths are bothered by too many radio fading effects.

The present invention uses motion sensors to help determine which room a tag is located in. Motion sensors have a relative advantage in that they perceive the motion inside a room, but they are shielded (by the wall) from sensing any motion in any adjacent room. In using the system and methods of present invention, the beacon inside the clean-storage room has a motion sensor including but not limited to a passive infrared (IR) sensor, microwave sensor, area reflective sensor, ultrasonic and vibration sensors. The beacon inside the soiled-storage room has its own motion sensor. Each motion sensor can detect motion of assets or people inside its room, and detect lack of motion, and perhaps detect the difference between limited motion (like a patient sitting in a chair) and walking motion. Neither motion sensor can sense any motion on the opposite side of the shared wall.

With the present invention, each beacon in each room sends a regular advertisement. When the beacon senses no motion in its room, it includes that no-motion status data in its advertisement. When the beacon senses motion in its room, it includes that motion-sensor reading in its advertisement. The motion-sense-status that the beacon reads in the room may have more than two states: The states may be "no motion", "the motion of a patient sitting in a bed or chair", and "the motion of a human walking in a room". The beacon therefore broadcasts (in its transmitted advertisement) its motion-sense-status as more like a patient sitting in a bed, or more like a human walking through the room, for further accuracy of tag-location fixes. Since motion-status changes in one room are likely to be non-coincident with motion-status changes in an adjacent room, each room will have a unique "motion fingerprint" for its last few minutes of observed time. When a listening tag hears multiple beacons and wants to estimate which room it is in, it will start considering the received signal strength of beacon advertisements. But with the current invention, it may secondly estimate its room-location based on the coincident timing of its own changes in motion, and the timing of reported changes in motion from the neighboring beacons. The motion-sensing data is room-specific, enabling a room-level location fix, even for assets that are close to a wall. Assets in the clean room are determined to be in the clean room because their motion pattern when they stopped moving (that is, laid on a shelf) matches the motion sensed by the beacon in their room.

In the system and method described herein, each tag contains an accelerometer. The tag always knows when it is moving, when it is not moving, and when it transitions from movement to stopped, with some sense of the pace of movement. So the tag will likely estimate its room location, by favoring beacons (and therefore rooms) whose motion status matches the tag's motion.

By way of example, if a clinical employee at a hospital were bringing an asset into a clean storage room and places the asset on a shelf, at the shared wall between the clean and soiled storage room where the employee leaves the room, the system and methods according to the present invention can quickly locate the asset because the RTLS architecture places a beacon at the doorway or ceiling of each room. If the RTLS used only radio signal strength to determine location of the asset, the signal between a beacon and the asset tag in the same room may be blocked by metal objects, reduced by polarization effects, or faded by multipath interference, to the point where the asset tag hears a beacon in an adjacent room more strongly than it hears the beacon in its own room. Thus, the RTLS using only radio signal strength will provide inaccurate locations or mis-estimates of the asset. Thus, when using only RSSI measurements, if there were numerous assets lined up on the shelves on both sides of the wall, it is likely that many of the assets will have mis-estimated room location.

As another illustration of the unique benefit of the current invention, consider the challenge of locating a tag-wearing staff member or patient. In current systems using only RSSI measurements, radio signals are absorbed by the human body. The signal-strength location engine will struggle to determine where a staff or patient is actually located and may report an adjacent (incorrect) room as the location of the staff tag. According to aspects of the current invention, the beacons may report (in each beacon transmission) the current motion status in the room as measured at the beacon, plus the motion status at predetermined time periods (e.g. six seconds ago and 12 seconds ago). As an example, a beacon can report in its advertisement that there was no motion in a room 12 seconds ago, no motion six seconds ago, but there is motion currently happening in the room that is consistent with a human at walking speed. One adjacent beacon may report no motion at all. A second adjacent beacon may report motion at all three historical timestamps. A staff tag or patient tag knows that it is moving because of its accelerometer and receives all three beacons. The tag can determine that it is unlikely to be in the room with the beacon that has seen no motion at all. The tag can compare a recent, coincident rise in the signal strength of a beacon with the data that the beacon advertises, saying that it has recently transitioned from a state of "no motion seen" to "motion seen", and conclude that the tag's entry into that beacon's room is likely the cause of both the increased received signal strength and the transition from no motion to motion. The tag and location engine then estimate the tag's room location by favoring the beacon whose reported motion-transition matches the pattern of received-signal-strength changes. The location engine is therefore more accurate than a system based on signal strength alone.

The motion sensor within a beacon may be able to discriminate multiple statuses of motion, for example it can distinguish between no motion, the motion of a patient sitting in a bed or chair, and the motion of a human walking in a room. The tag's accelerometer also can discriminate between no motion, partial-body motion, and walking motion. These multiple statuses of motion establish data points to help tags determine whether location changes have occurred for personnel-tracking. The motion of a patient sitting in a bed or chair will not fool the tag into giving erroneous data that it has moved, but instead the tag will be correlating room-changes to the walking motion (perceived coincidentally in the tag's accelerometer and the beacon's motion sensor).

Each beacon will include in its advertisement another piece of data: Its room type. The beacon's transmission of its room-type in every advertisement helps the tag to determine whether a room-change has recently occurred, versus whether spurious radio signals indicate a false room-change. Typical "room types" in a hospital setting are patient room, hallway, equipment storage room, and elevator lobby. Tags may sometimes mis-estimate their room-transition if they are relying on only radio signals, or even radio signals with motion sensing capability. But tags that know the room-types of each beacon can use that information in several ways to correct mis-estimates of location. As one example, a tag can be told that it is very unlikely for a room-location transition between a patient room and an equipment storage room, so it is not fooled by a single random RSSI fluctuation in a beacon signal from an equipment room. However, the tag knows that the typical transition from a patient room is into a hallway, and the typical transition into an equipment storage room is from a hallway, so it will favor the location updates between hallways and specific room types, while discouraging the transitions that are less likely.

Each beacon will include in its advertisement another piece of data: the floor on which it has been installed. A tag knows that a movement from a patient room on one floor directly to a patient room on an adjacent floor is not likely (and a radio algorithm that reports such a change may be mistaken because of a spurious radio signal from another floor). Therefore, the tag will be told to reject an apparent floor-hop from a patient room to another floor, because that move is unlikely. But a transition from an elevator lobby on one floor to an elevator lobby on a different floor is very possible, so the tag should accept that reported location change when it is confirmed by the signal strength and motion-sensing algorithm.

Each beacon will establish a communication channel to the location engine, perhaps by a Wi-Fi network, or by a BLE connection through a bridge. This communication channel can carry data from the location engine to the bridge. This communication channel may therefore be the carrier of information from the location engine such as an identification of the floor number where the beacon has been mounted in the hospital. The communication channel may also be the carrier of information from the location engine such as the room-type of the room where the beacon has been mounted in the hospital.

Hence, the location engine in the current invention uses at least three algorithmic methods and/or processes in series to estimate the location of a tag. These processes include:

1) Measurements of the signal strengths of nearby beacon advertisements, received by the tag, employing proximity or trilateration analysis and motion-history analysis, to estimate room location from messages heard at the tag.
2) Each beacon will advertise the motion status as perceived by its motion sensor. Each tag will read motion-status of each beacon it hears, allowing the tag to compare its own motion pattern to the motion patterns of nearby sensors, and estimate its room-location. Each beacon will also advertise its room-type, and its floor where it is located, which helps the tag to confirm or refute the motion-sensed location change by disallowing room-changes that are unlikely, further improving accuracy of the room-location estimate.
3) Finally, the tag or location engine blends its room-location estimates from the two algorithms above to finalize its location estimate for the tag.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A real-time location system (RTLS) having tags, beacons, bridges, and a location server for providing people and asset-tag locating, comprising:
    at least one beacon equipped with a motion sensor, that uses the motion sensor to include a history of motion status sensed in a beacon's room, embedded in radio transmissions from the at least one beacon;
    at least one bridge for receiving location-update messages from at least one tag, and measuring multiple characteristics of the received location-update messages, including received signal strength, and forwarding those location-update messages to a central server;
    at least one tag for listening for radio transmissions from the beacons, and measuring multiple characteristics of the received transmissions, including received signal strength and the beacons' indication of motion status in the beacon's room, where patterns of accelerometer-sensed-motion status of the tag are compared to patterns of the motion status in the beacons' transmissions, and location-update messages are transmitted to the at least one bridge; and
    a central location server utilizing a plurality of location-determining methods comprising:
        a first location method for determining a first location estimate for the at least one tag, based on radio characteristics of BLE beacon signals emitted by at least one beacon in fixed locations and received by the at least one tag, and transmitted to the central location server;
        a second location method for determining a second location estimate for the at least one tag, based on comparing changes in the history of motion status in the beacons' rooms, and the coincident history of changes in accelerometer-determined motion status of the at least one tag that is likely in the room; and
        a third location method for combining the first location estimate and second location estimate to determine a location result for the at least one tag.

2. The RTLS as in claim 1, wherein the at least one tag further comprising:
    a BLE transceiver;
    a microprocessor for driving the BLE transceiver;
    a battery for powering the transceiver; and
    an accelerometer for detecting motion, used by the microprocessor to compare changes in the motion-status of the tag to motion status messages received by the tag from one or more beacons.

3. The RTLS as in claim 1, wherein the at least one beacon comprising:
    a BLE transceiver;
    a microprocessor for operating the transceiver;
    a motion sensor for detecting motion in the beacon's room and including motion status in its beacon transmissions;
    a battery for powering the BLE transceiver and the microprocessor; and
    at least one antenna for broadcasting the RF signal from the BLE transceiver to tags in proximity to the beacon.

4. The RTLS as in claim 1, wherein the at least one bridge comprising:
    a BLE transceiver;
    a Wi-Fi transceiver;
    a microprocessor for operating the transceivers and forwarding location-update messages from the one or more tags to the central location server; and
    an optional motion sensor for detecting motion in the bridge's room and reporting motion status of the room to the central location server.

5. A real-time location system (RTLS) having tags, beacons, bridges, and a location server for providing people and asset-tag locating, comprising:
    at least one beacon for transmitting Bluetooth low energy (BLE) advertisements, equipped with a motion sensor and transmitting recent history of motion status sensed in a beacon room;
    at least one bridge for receiving location-update messages from at least one tag and measuring multiple characteristics of the received location-update messages, including received signal strength, and a motion sensor for determining motion status in the bridge's room;

at least one tag for listening for BLE advertisements from the beacons and measuring multiple characteristics of the received advertisements, including received signal strength and a series of advertisements of motion status in the beacon's room, where accelerometer-sensed-motion status of the tag is compared to the motion status in the beacons' advertisements, and location-update messages are transmitted to the at least one bridge;

a central location server utilizing a plurality of location-determining methods comprising:

a first location method for calculating a first location estimate for the at least one tag, based on radio characteristics of BLE beacon signals emitted by at least one beacon in fixed locations and received by the at least one tag, and transmitted to the central location server;

a second location method for calculating a second location estimate for the at least one tag, based on comparing changes in the history of motion status in the beacons' rooms, optional changes in the history of motion changes in the bridges' rooms, and the coincident history of changes in accelerometer-determined motion status of the at least one tag that is likely in the room; and a third location method for combining the first location estimate and second location estimate to determine a location result for the at least one tag.

6. The RTLS as in claim 5, wherein the at least one tag further comprising:
a BLE transceiver;
a microprocessor for driving the BLE transceiver;
a battery for powering the transceiver; and
an accelerometer for detecting motion, used by the microprocessor to determine and report changes in the motion-status of the tag.

7. The RTLS as in claim 6, wherein the at least one tag estimates its own probability of a location change based upon at least one of current signal strength readings, past signal strength readings, changes in motion status received in the beacon advertisement, accelerometer/motion status of the tag, or fading characteristics of the environment processed by a mathematical filter.

8. The RTLS as in claim 7, wherein the probability is used to either transmit or withhold location update information or to report location while minimizing the energy spent transmitting.

9. The RTLS as in claim 5, wherein the at least one beacon comprising:
a BLE transceiver;
a microprocessor for operating the transceiver;
a motion sensor for detecting motion in the beacon's room;
a battery for powering the BLE transceiver and the microprocessor; and
at least one antenna for broadcasting the RF signal from the BLE transceiver to a target area(s) within the floor and room for providing the tag with an accurate floor-level location reference or room-level location reference.

10. The RTLS as in claim 5, wherein the at least one bridge comprising:
a BLE transceiver;
a Wi-Fi transceiver;
a microprocessor for operating the transceivers; and
a motion sensor for detecting motion in the bridge's room.

11. The RTLS as in claim 10, wherein the bridge transmits the motion-status in its room to the location engine, and the location engine may build a movement-history record for the bridge's room, to be used in locating tags.

12. The RTLS as in claim 5, wherein the at least one beacon comprising:
a BLE transceiver;
a microprocessor for operating the transceiver;
a battery for powering the BLE transceiver and the microprocessor;
at least one antenna for broadcasting the RF signal from the BLE transceiver to tags in its proximity; and
a communication channel to the location engine, through which the location engine informs the beacon which floor of a building it has been placed on, for use of the beacon to include that floor-reference in its transmitted advertisements, so that the at least one tag may use the floor reference heard from multiple perceived beacon advertisements to determine whether a tag has been moved to a different floor, and to determine the floor location of the tag.

13. The RTLS as in claim 5, wherein the at least one beacon comprising:
a BLE transceiver;
a microprocessor for operating the transceiver;
a battery for powering the BLE transceiver and the microprocessor;
at least one antenna for broadcasting the RF signal from the BLE transceiver to tags in its proximity; and
a communication channel to the location engine, through which the location engine informs the beacon what type of room it has been placed in, for use of the beacon to include that room-type in its transmitted advertisements, so that the at least one tag may use the room types heard from multiple perceived beacon advertisements to estimate the likelihood that a tag has moved from one beacon's room to another beacon's room.

* * * * *